United States Patent
Marus et al.

(10) Patent No.: US 8,483,897 B2
(45) Date of Patent: Jul. 9, 2013

(54) VEHICULAR PROPULSION SYSTEMS AND METHODS FOR MANAGING THE SAME

(75) Inventors: James D. Marus, Royal Oak, MI (US); James C. Gibbs, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 12/855,849

(22) Filed: Aug. 13, 2010

(65) Prior Publication Data

US 2012/0041621 A1  Feb. 16, 2012

(51) Int. Cl.
- *B60L 9/00* (2006.01)
- *B60L 11/00* (2006.01)
- *G05D 1/00* (2006.01)
- *G05D 3/00* (2006.01)
- *G06F 7/00* (2006.01)
- *G06F 17/00* (2006.01)

(52) U.S. Cl.
USPC ............................................................ 701/22

(58) Field of Classification Search
USPC ............................................................ 701/22
See application file for complete search history.

(56) References Cited

U.S. PATENT DOCUMENTS

| | | | | |
|---|---|---|---|---|
| 3,637,956 | A | * | 1/1972 | Blackman ........................ 191/4 |
| 4,489,242 | A | * | 12/1984 | Worst ........................... 307/10.1 |
| 5,507,153 | A | | 4/1996 | Seto et al. |
| 6,384,559 | B2 | | 5/2002 | Egami |
| 6,745,117 | B1 | * | 6/2004 | Thacher et al. ................. 701/50 |
| 7,224,142 | B2 | * | 5/2007 | Asaumi et al. ................ 320/104 |
| 2007/0142985 | A1 | * | 6/2007 | Kumar ............................ 701/22 |
| 2009/0107743 | A1 | * | 4/2009 | Alston et al. ............... 180/65.21 |
| 2011/0202220 | A1 | * | 8/2011 | Seta et al. ....................... 701/22 |
| 2011/0208378 | A1 | * | 8/2011 | Krueger et al. ................. 701/22 |

FOREIGN PATENT DOCUMENTS

WO  2009088406 A2  7/2009

OTHER PUBLICATIONS

German Office Action, dated Sep. 5, 2012, for German Patent Application No. 10 2011 080 326.2.

* cited by examiner

*Primary Examiner* — Prasad Gokhale
(74) *Attorney, Agent, or Firm* — Ingrassia Fisher & Lorenz, P.C.

(57) ABSTRACT

Vehicular propulsion systems and methods for managing propulsion systems are provided. The remaining energy in an energy supply coupled to a propulsion actuator on-board a vehicle is monitored. The energy provided to an on-board auxiliary non-propulsion load device from the energy supply is automatically limited based on the remaining energy in the energy supply.

12 Claims, 2 Drawing Sheets

VEHICULAR PROPULSION SYSTEMS AND METHODS FOR MANAGING THE SAME

TECHNICAL FIELD

The present invention generally relates to vehicular electrical systems. More specifically, the present invention relates to vehicular electrical systems that are configured to provide power to external loads.

BACKGROUND OF THE INVENTION

In recent years advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries perhaps in combination with another actuator, to drive the wheels. These vehicles also include countless non-propulsion devices, such as air conditioning, lighting, and entertainment systems, that drain power from the on-board energy supplies.

Typically, the control systems on automobiles will simply allow both the propulsion actuators (e.g., traction motors) and non-propulsion loads (e.g., the air conditioner) to consume power at the same time, with no regard for the effect the use of the non-propulsion load has on the driving range of the vehicle. This is usually the case even when the energy remaining in the on-board energy storage devices (e.g., batteries or fuel tanks) drops to very low levels. As a result, the occupants of the vehicle may get stranded, as the vehicle does not have the range required to reach the desired destination.

Accordingly, it is desirable to provide vehicular propulsion systems and methods for managing vehicular propulsion systems that increase the driving range of the vehicle by controlling the power consumed by auxiliary devices. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a vehicular propulsion system is provided. The vehicular propulsion system includes an energy supply, a propulsion actuator coupled to the energy supply, at least one non-propulsion auxiliary load device coupled to the energy supply, and a controller coupled to the energy supply, the propulsion actuator, and the at least one non-propulsion auxiliary load device. The controller is configured to monitor remaining energy in the energy supply and limit energy provided to the at least one auxiliary non-propulsive load device from the energy supply based on the remaining energy in the energy supply.

In another embodiment, an automotive propulsion system is provided. The automotive propulsion system includes an electrical energy storage device, an electric propulsion motor coupled to the electrical energy storage device, a plurality of non-propulsion auxiliary load devices coupled to the electrical energy storage device, and a controller coupled to the electrical energy storage device, the electric propulsion motor, and the plurality of non-propulsion auxiliary load devices. The controller is configured to monitor remaining electrical energy in the electrical energy storage device and limit energy provided to the plurality of auxiliary non-propulsive load devices from the electrical energy storage device based on the remaining electrical energy in the electrical energy storage device.

In a further embodiment, a method for managing a vehicular propulsion system is provided. Remaining energy in an energy supply coupled to a propulsion actuator on-board a vehicle is monitored. Energy provided to an on-board auxiliary non-propulsion load device from the energy supply is automatically limited based on the remaining energy in the energy supply.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-3 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 1:
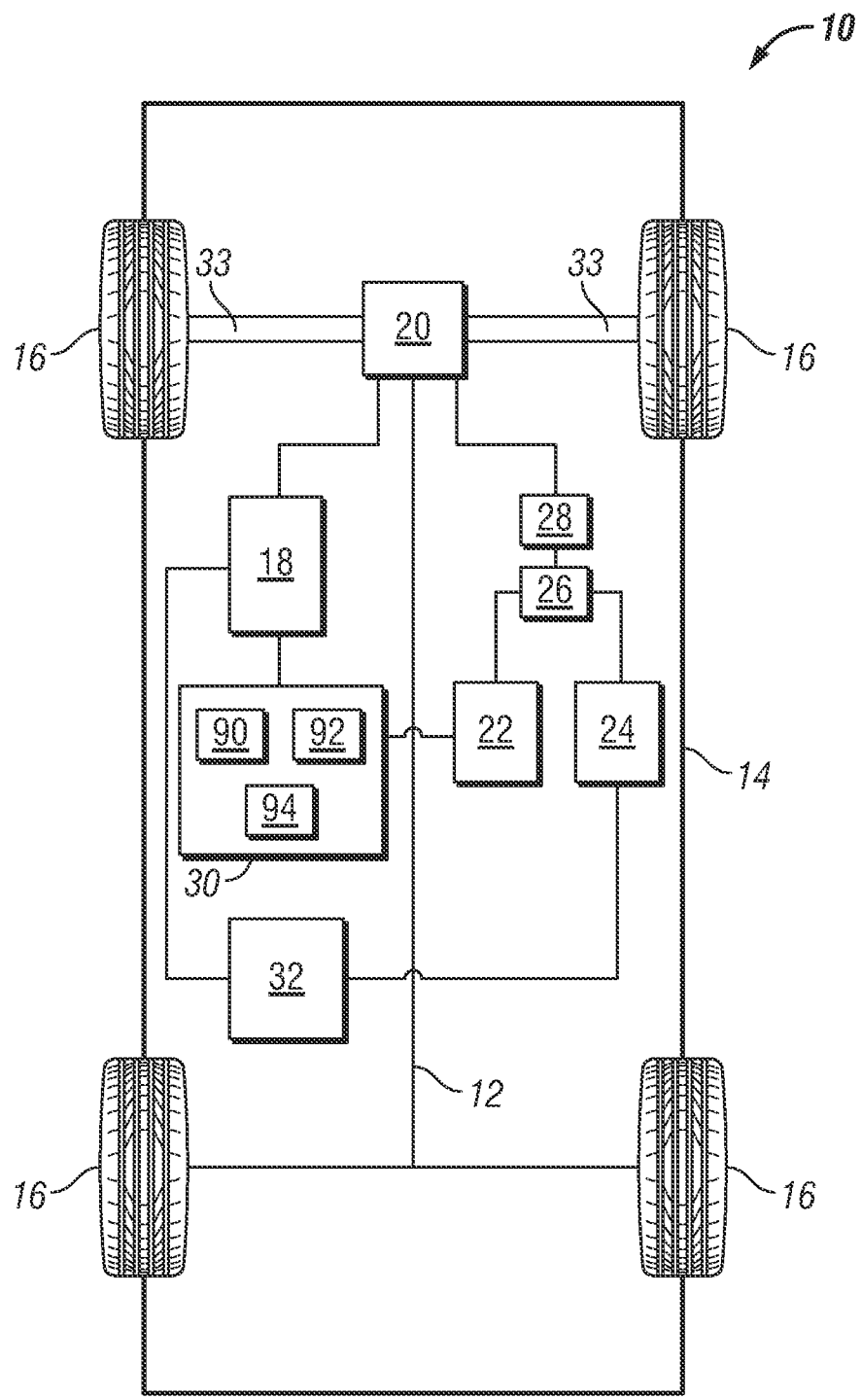
FIG. 1 is a schematic view of an exemplary automobile according to an embodiment.
Figure 2:
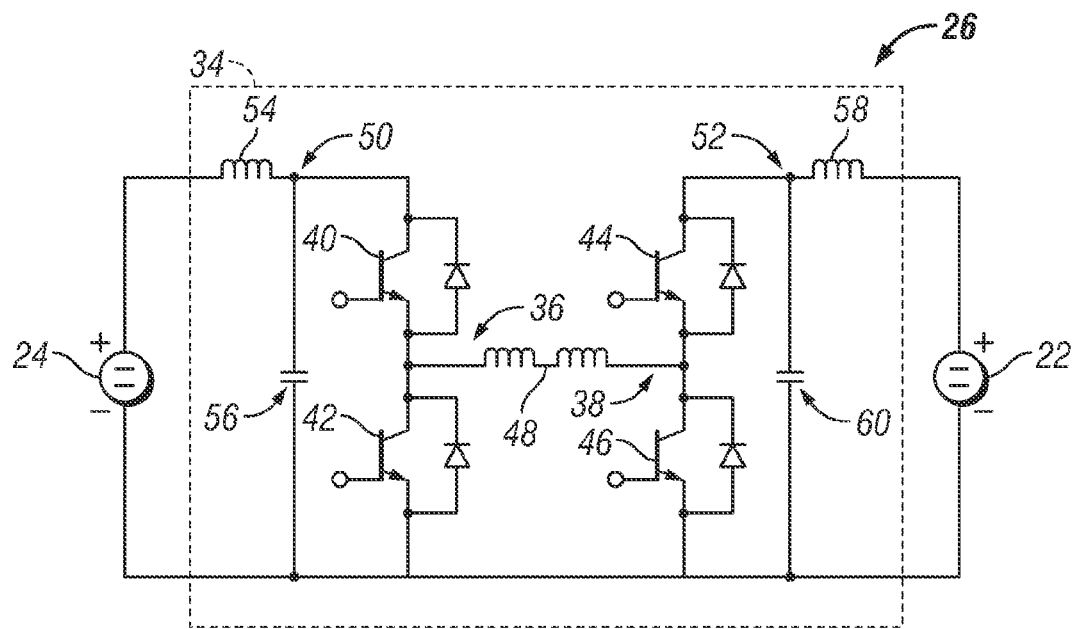
FIG. 2 is a schematic view of a direct current-to-direct current (DC/DC) power converter within the automobile of FIG. 1, according to an embodiment.
Figure 3:
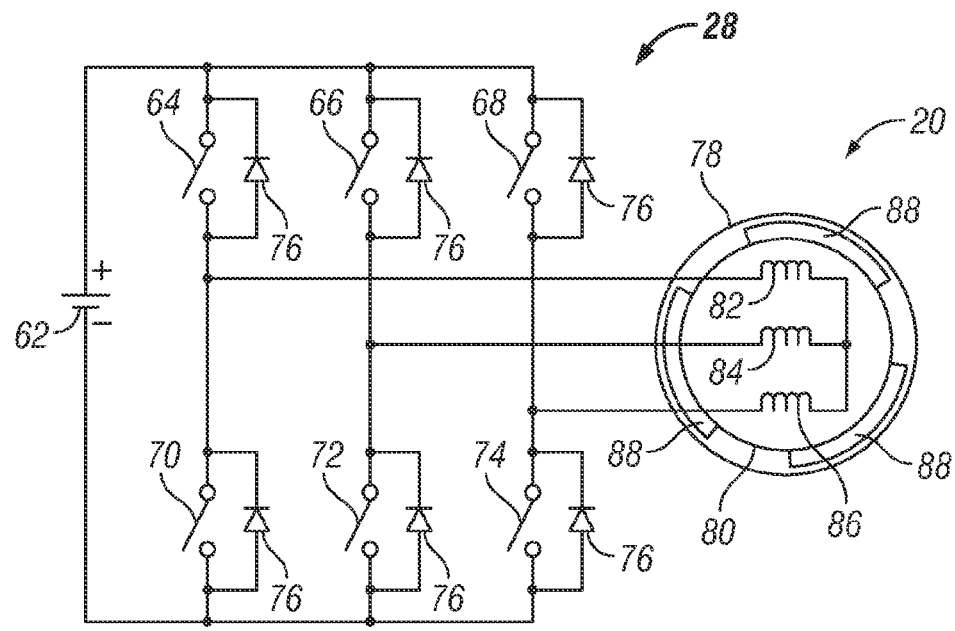
FIG. 3 is a schematic view of a power inverter and an electric motor within the automobile of FIG. 1, according to an embodiment.

FIG. 1 to FIG. 3 illustrate a vehicular propulsion system. The vehicular propulsion system includes an energy supply (e.g., a high voltage battery, a low voltage battery, a fuel tank, etc.), a propulsion actuator coupled to the energy supply, at least one non-propulsion auxiliary load device coupled to the energy supply, and a controller coupled to the energy supply, the propulsion actuator, and the at least one non-propulsion auxiliary load device. The controller is configured to monitor the remaining energy in the energy supply and limit the energy provided to the at least one auxiliary non-propulsive load device from the energy supply based on the remaining energy in the energy supply.

FIG. 1 is a schematic view a vehicle (or "automobile" or vehicular propulsion system) 10, according to an embodiment. The automobile 10 includes a chassis 12, a body 14, four wheels 16, and an electronic control system (or a controller) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of propulsion actuators, such as, for example, an electric motor, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, and a combustion/electric motor hybrid engine (i.e., such as in a hybrid electric vehicle (HEV)).

In the exemplary embodiment illustrated in FIG. 1, the automobile 10 is an electric vehicle (EV) and further includes an electric motor/generator 20, a high voltage battery 22 (i.e., an energy supply or electrical energy storage device), a low voltage battery 24, a DC/DC converter system (or DC/DC converter) 26, a direct current-to-alternative current (DC/AC) power inverter 28, a high voltage auxiliary load system 30, and a low voltage auxiliary load system 32.

Still referring to FIG. 1, the electric motor 20 is mechanically coupled to at least some of the wheels 16 through one or more drive shafts 33. The high voltage battery 22 is one suitable for use in an electric vehicle, as is commonly understood, such as a lithium ion battery rated at 300-400 volts (V). The low voltage battery 24 is, for example, a lead-acid SLI (starter, lighting, ignition) 12 V battery.

FIG. 2 schematically illustrates the DC/DC converter system 26 in greater detail, in accordance with an exemplary embodiment of the present invention. In the depicted embodiment, the DC/DC converter system 26 includes a bi-directional DC/DC converter (BDC) 34 coupled to the high voltage battery 22 and the low voltage battery 24. The BDC converter 34, in the depicted embodiment, includes a power switching section with two dual insulated gate bipolar transistor (IGBT) legs 36 and 38, each having two insulated gate bipolar transistors (IGBTs) 40 and 42, and 44 and 46, respectively. The two legs 36 and 38 are interconnected at midpoints by a switching inductor (or switching inductors) 48. The BDC converter 34 also includes a first filter 50 connected to the positive rail of the first IGBT leg 36 and a second filter 52 connected to the positive rail of the second IGBT leg 38. As shown, the filters 50 and 52 include a first inductor 54, a first capacitor 56, a second inductor 58, and a second capacitor 60, respectively. The first IGBT leg 36 is connected to the high voltage battery 22 through the first filter 50, and the second IGBT leg 38 is connected to the high voltage battery 22 through the second filter 52. As shown, the high voltage battery 22 and the low voltage battery 24 are not galvanically isolated, as the negative (−) terminals are electrically connected.

Although not shown, the DC/DC converter system 26 may also include a BDC controller in operable communication with the BDC converter 34. The BDC controller may be implemented within the electronic control system 18 (FIG. 1), as is commonly understood in the art.

FIG. 3 schematically illustrates the inverter 28 and the motor 20 in greater detail. In the depicted embodiment, the inverter 28 includes a three-phase circuit coupled to the motor 20. More specifically, the inverter 28 includes a switch network having a first input coupled to a voltage source 62 (e.g., the DC/DC converter system 26) and an output coupled to the motor 20. Although a single voltage source is shown, a distributed DC link with two or more series sources may be used.

The switch network comprises three pairs of series power switching devices (or switches or components) with antiparallel diodes (i.e., antiparallel to each switch) corresponding to each of the phases of the motor 20. Each of the pairs of series switches comprises a first switch, or transistor, (i.e., a "high" switch) 64, 66, and 68 having a first terminal coupled to a positive electrode of the voltage source 62 and a second switch (i.e., a "low" switch) 70, 72, and 74 having a second terminal coupled to a negative electrode of the voltage source 62 and a first terminal coupled to a second terminal of the respective first switch 64, 66, and 68.

As is commonly understood, each of the switches 64-74 may be in the form of individual semiconductor devices such as insulated gate bipolar transistors (IGBTs) within integrated circuits formed on semiconductor (e.g., silicon) substrates (e.g., die). As shown, a diode 76 is connected in an antiparallel configuration (i.e., a "flyback" or "freewheeling" diode) to each of the switches 64-74. As such, each of the switches 64-74 and the respective diode 76 may be understood to form a switch-diode pair or set, six of which are included in the embodiment shown. Although not shown, the inverter 28 may also include current sensors (e.g., Hall Effect sensors) to detect the flow of current through the switches 64-74 (and/or windings 82, 84, and 86).

As will be appreciated by one skilled in the art, the electric motor 20, in one embodiment, is a three-phase, permanent magnet electric motor and includes a stator assembly 78 and a rotor assembly 80, as well as a transmission and a cooling fluid (not shown). The stator assembly 78 includes a plurality (e.g., three) conductive coils or windings 82, 84, and 86, each of which is associated with one of the three phases of operation of the electric motor 20, as is commonly understood. The rotor assembly 80 includes a plurality of magnets 88 and is rotatably coupled to the stator assembly 78. The magnets 88 may include multiple (e.g., sixteen) electromagnetic poles, as is commonly understood. It should be understood that the description provided above is intended only as an example of one type of electric motor that may be used.

Referring again to FIG. 1, in the depicted embodiment, the high voltage auxiliary load system 30 includes various auxiliary, non-propulsion loads (e.g., systems or devices) that are powered by the high voltage battery 22 (as are the motor 20 and the DC/DC converter 26). Generally, these load devices may simply be electrical components, devices, or subsystems that receive power from, for example, the high voltage battery 22. Examples of high voltage auxiliary, non-propulsion loads include an air conditioner compressor 90, a cabin coolant heater 92, and high voltage battery heater 94.

Similarly, the low voltage auxiliary load system 32 includes various auxiliary, non-propulsion loads that are powered by the low voltage battery 24 (or powered by the high voltage battery 22 via the DC/DC converter 26 and the low voltage battery 24). Examples of low voltage auxiliary, non-propulsion loads include window defoggers, mirror heaters, seat heaters, various lights, Positive Temperature Coefficient (PTC) heaters, various fans and pumps, window wipers, and entertainment system components (e.g., a radio), as well as other components in the "center stack" in the cabin the automobile 10.

Referring again to FIG. 1, the electronic control system 18 is in operable communication with the electric motor 20, the high voltage battery 22, the low voltage battery 24, the DC/DC converter 26, the inverter 28, and the high voltage auxiliary load system 30, and the low voltage auxiliary load system 32. Although not shown in detail, the electronic control system 18 includes various sensors and automotive control modules, or electronic control units (ECUs), such a power electronic (e.g., inverter and converter) control module, a motor controller, and a vehicle controller, and at least one processor (or processing system) and/or a memory having instructions stored thereon (or in another computer-readable medium) for carrying out the processes and methods as described below.

Referring to FIG. 1, during normal operation (i.e., driving), the automobile 10 is operated by providing power to the wheels 16 with the electric motor 20 using the high voltage battery 22. In order to power the electric motor 20, DC power is provided from the high voltage battery 22 and/or the low voltage battery 24 by the DC/DC converter 26 to the inverter 28, which converts the DC power into AC power, before the power is sent to the electric motor 20. As will be appreciated by one skilled in the art, the conversion of DC power to AC power is substantially performed by operating (i.e., repeatedly switching) the transistors within the inverter 28 at an operating (or switching) frequency, such as, for example, 12 kilohertz (kHz). The inverter controller within the electronic control system 18 performs multiple operations during normal, or forward, operation including, but not limited to, receiving a torque command, converting the torque command to current commands based on present speed and available voltage, and performing regulation on such current commands.

As will be appreciated by one skilled in the art, the operation of the switches 64-74 (FIG. 3) causes current to flow through the windings 82, 84, and 86 in the motor 20. The interaction of this current with the magnetic fields generated by the magnets 88 causes a Lorentz force to be generated, thus causing the rotor assembly 80 to rotate relative to the stator assembly 78.

Still referring to FIG. 1, the high voltage battery 22 also provides power to the components within the high voltage auxiliary load system 30 and the low voltage battery 24 (via the DC/DC converter 26). The low voltage battery 24 provides power to the components within the low voltage auxiliary load system 32.

According to one aspect of the present invention, the energy remaining in the high voltage battery 22 (or other energy supply) is monitored by the electronic control system 18. When the remaining energy in the high voltage battery 22 (and/or the driving range of the automobile 10) drops below a particular level, the energy provided to components within the high voltage auxiliary load system 30 and/or the low voltage auxiliary load system 32 is automatically limited to optimize the range of the automobile 10.

The range optimization algorithm regulates power allocated to specific high voltage and low voltage non-propulsion devices by forcing them to consume only the minimum amount of power required to support proper sub-system functionality and sub-system requirements under specific vehicle conditions and/or shutting them off completely. The energy unused by these devices is then available for use by the motor 20 (or other propulsion actuator), thus increasing the range of the automobile. For example, an automobile 10 may be able to have its range extended by approximately 1 mile by preserving 2 kilowatts (kW) of power during the last 5 minutes of a drive cycle.

The algorithm first determines when the automobile 10 is in a "low range" state as defined by a specific amount of energy limited to the remainder of the drive cycle. The algorithm determines how much energy is available to the automobile 10 by monitoring, for example, the energy available in the high voltage battery 22 and/or the state of charge (SOC) of the high voltage battery 22. In other embodiments, such as in an automobile with an internal combustion engine, the algorithm may similarly monitor the energy available in a combustion fuel tank and/or the fuel remaining in the fuel tank, or the availability of the combustion engine to be used as a generator to charge the high voltage battery (such as in a series HEV).

The algorithm may include a "tiered" optimization scheme to further limit the power provided to the auxiliary loads as the available energy decreases (e.g., tier 1 at 0.5 kW Hrs remaining, tier 2 at 0.2 kW Hrs remaining, etc.).

The algorithm includes input parameters and calibrations to control which auxiliary devices and sub-systems are allowed to be under power constraints at various levels of low range. Specific parameters are monitored to best optimize the use of power while ensuring critical devices and sub-systems are allocated power. That is, when the energy remaining in the high voltage battery 22 drops or decreases below a particular threshold, and the algorithm determines that the power to at least some of the auxiliary components should be reduced, various factors determine which of the components are to see reduced power and when the power is to be reduced. These factors may include the operating temperature of the high voltage battery 22, the temperature of the air outside the automobile 10, fluid pressure on the "high side" of the air conditioner compressor 90, as is commonly understood, the SOC of the high voltage battery 22, and the temperature of the coolant for various heaters.

As an example, if (and/or when) the power provided to the air conditioner compressor 90 is to be reduced may change depending on the outside air temperature. That is, the higher the temperature outside the automobile 10, the less likely the algorithm may be to reduce the power to the air conditioner compressor 90, which is one of the components in the high voltage auxiliary load system 30.

Likewise, power reduction to the components in the low voltage auxiliary load system 32 may be affected by various factors. As another example, ambient lighting conditions or the time of day may affect whether or not power to various lights or lighting systems on the automobile 10 is to be reduced. That is, the lower the ambient light level, the less likely the algorithm may be to reduce power to head lamps or interior cabin lights.

The power reduction or limiting may include operating the particular load in such a way to reduce power consumption or simply turning the load OFF. Loads that require AC power may have their power consumption limited by the switching scheme used by the respective inverter (e.g., the inverter 28) that provides each of them power. The components in the low voltage auxiliary load system 32 may have their power consumption reduced in part by the DC/DC converter 26, as the DC/DC converter 26 generally charges the low voltage battery 24 with power provided by the high voltage battery 22.

In some embodiments, the user (e.g., the driver) may be provided with a notification that power to some of the auxiliary systems is being reduced. For example, a text message may be displayed on the digital instrument cluster (DIC), such as "Low Range Power Optimization in Effect."

Likewise, a vehicle equipped with voice notifications and commands may notify the driver that the vehicle is in a low range state and allow the driver to activate (and/or deactivate) the low range power optimizer feature through voice commands.

One advantage of the system and method described above is that the driving range of the automobile is extended. As a result, the likelihood that the driver and other occupants will get stranded is reduced. Another advantage is that because the order and timing of the reduction of power to various auxiliary systems is dynamic, the driving experience for the occupants is optimized, while still increasing the range of the vehicle.

The systems and methods described above may be implemented in other types of automobiles, such as those using an internal combustion engine as the propulsion actuator, a fuel tank as the energy supply, and an alternator to charge the low voltage battery. Further, systems and methods may be used in vehicles other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular propulsion system comprising:
   an energy supply including a low voltage battery and a high voltage battery;
   a propulsion actuator coupled to the energy supply;
   a direct current-to-direct current (DC/DC) converter coupled to the energy supply;
   at least one non-propulsion auxiliary load device coupled to the energy supply, the at least one non-propulsion auxiliary load device including a plurality of low voltage non-propulsion auxiliary load devices coupled to the low voltage battery; and
   a controller coupled to the energy supply, the propulsion actuator, and the at least one non-propulsion auxiliary load device, the controller being configured to:
   monitor remaining energy in the energy supply; and
   limit energy provided to the at least one auxiliary non-propulsive load device from the energy supply based on the remaining energy in the energy supply,
   wherein the plurality of low voltage non-propulsion auxiliary load devices are coupled to the energy supply through the low voltage battery and the DC/DC converter.

2. The vehicular propulsion system of claim 1, wherein the propulsion actuator comprises an electric motor.

3. The vehicular propulsion system of claim 1, wherein the at least one non-propulsion auxiliary load device further comprises a heater, a compressor, or a combination thereof.

4. The vehicular propulsion system of claim 1, wherein the plurality of low voltage non-propulsion auxiliary load devices comprises seat heaters, passenger compartment lights, an entertainment center, window wipers, fans, or a combination thereof.

5. The vehicular propulsion system of claim 1, wherein the energy supply further comprises a combustion fuel tank and the propulsion actuator comprises an internal combustion engine.

6. The vehicular propulsion system of claim 5, wherein the vehicle propulsion system further comprises an alternator coupled to the internal combustion engine and the low voltage battery.

7. An automotive propulsion system comprising:
   an electrical energy storage device including a low voltage battery coupled to a high voltage battery;
   a direct current-to-direct current (DC/DC) converter coupled to the high voltage battery and the low voltage battery;
   an electric propulsion motor coupled to the electrical energy storage device;
   a plurality of non-propulsion auxiliary load devices coupled to the electrical energy storage device; and
   a controller coupled to the electrical energy storage device, the electric propulsion motor, and the plurality of non-propulsion auxiliary load devices, the controller being configured to:
   monitor remaining electrical energy in the electrical energy storage device; and
   limit energy provided to the plurality of auxiliary non-propulsive load devices from the electrical energy storage device based on the remaining electrical energy in the electrical energy storage device,
   wherein the plurality of auxiliary non-propulsion load devices comprises a plurality of high voltage load devices and a plurality of low voltage load devices, and the plurality of low voltage load devices are coupled to the electrical energy storage device through the low voltage battery and the DC/DC converter.

8. A method for managing a vehicular propulsion system comprising:
   monitoring remaining energy in an energy supply coupled to a propulsion actuator on-board a vehicle, the energy supply including a low voltage battery and a high voltage battery; and
   automatically limiting energy provided to one or more of a plurality of on-board auxiliary non-propulsion load devices from the energy supply based on the remaining energy in the energy supply, the plurality of on-board auxiliary non-propulsion load devices including a plurality of low voltage load devices, the plurality of low voltage load devices coupled to the energy supply through the low voltage battery and a direct current-to-direct current (DC/DC) converter.

9. The method of claim 8, wherein the propulsion actuator comprises an electric motor.

10. The method of claim 9, wherein the plurality of non-propulsion auxiliary load devices comprise a heater, a compressor, or a combination thereof.

11. The method of claim 10, wherein the automatically limiting the energy provided to the plurality of on-board auxiliary, non-propulsion load devices is further based on air temperature outside the vehicle, ambient light level, or a combination thereof.

12. The method of claim 8, wherein the automatically limiting the energy provided to the plurality of on-board auxiliary, non-propulsion load devices occurs when the remaining energy in the energy supply decreases below a predetermined threshold.

\* \* \* \* \*